United States Patent
Gonzalez-Banos et al.

(10) Patent No.: US 10,713,391 B2
(45) Date of Patent: Jul. 14, 2020

(54) TAMPER PROTECTION AND VIDEO SOURCE IDENTIFICATION FOR VIDEO PROCESSING PIPELINE

(71) Applicants: Hector H. Gonzalez-Banos, Mountain View, CA (US); Ramya Narasimha, Palo Alto, CA (US)

(72) Inventors: Hector H. Gonzalez-Banos, Mountain View, CA (US); Ramya Narasimha, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 47 days.

(21) Appl. No.: 15/916,025

(22) Filed: Mar. 8, 2018

(65) Prior Publication Data
US 2018/0253567 A1    Sep. 6, 2018

Related U.S. Application Data

(63) Continuation-in-part of application No. 15/447,416, filed on Mar. 2, 2017.

(51) Int. Cl.
*G06F 21/64* (2013.01)
*G06T 1/00* (2006.01)
(Continued)

(52) U.S. Cl.
CPC .............. *G06F 21/64* (2013.01); *G06F 16/70* (2019.01); *G06F 21/16* (2013.01); *G06T 1/005* (2013.01);
(Continued)

(58) Field of Classification Search
CPC .......... G06F 21/64; G06F 16/70; G06F 21/16; G06T 1/005; H04L 63/12; H04N 21/8358; H04N 1/32144
See application file for complete search history.

(56) References Cited

U.S. PATENT DOCUMENTS 6,496,856 B1    12/2002   Kenner et al.
8,311,277 B2    11/2012   Feleg et al.
(Continued)

FOREIGN PATENT DOCUMENTS

EP    0 932 298    7/1999
EP    3070938      9/2016
(Continued)

OTHER PUBLICATIONS

Bastan et al., "BilVideo-7: an MPEG-7-compatible video indexing retrieval system," dated Jul. 2010, pp. 62-73.
(Continued)

*Primary Examiner* — Thai Q Tran
*Assistant Examiner* — Sunghyoun Park
(74) *Attorney, Agent, or Firm* — Patent Law Works LLP

(57) ABSTRACT

The disclosure includes a system and method for associating protection data to a video object and verifying the content and source of the video object based on the protection data. A video processing application receives, at a producer, a video object; computes, at the producer, a digital signature based on content of the first video object; adds, at the producer, identification information of the producer to the digital signature of the first video object, the producer being a source of the first video object; transmits the first video object along with the digital signature from the producer to a first consumer; and authenticates, at the first consumer, the content and source of the first video object based on the digital signature.

20 Claims, 9 Drawing Sheets

(51) Int. Cl.
    *H04N 21/8358* (2011.01)
    *H04L 29/06* (2006.01)
    *H04N 1/32* (2006.01)
    *G06F 21/16* (2013.01)
    *G06F 16/70* (2019.01)

(52) U.S. Cl.
    CPC ......... *H04L 63/12* (2013.01); *H04N 1/32144* (2013.01); *H04N 21/8358* (2013.01)

(56) References Cited

U.S. PATENT DOCUMENTS

| | | | |
|---|---|---|---|
| 8,949,235 B2 | 2/2015 | Feleg et al. | |
| 10,204,264 B1 | 2/2019 | Gallagher et al. | |
| 2002/0071556 A1* | 6/2002 | Moskowitz | G11B 20/00086 380/210 |
| 2002/0071596 A1 | 6/2002 | Estevez | |
| 2002/0172394 A1* | 11/2002 | Venkatesan | G06T 1/005 382/100 |
| 2002/0178368 A1 | 11/2002 | Yin et al. | |
| 2003/0058939 A1 | 3/2003 | Lee et al. | |
| 2003/0174773 A1 | 9/2003 | Comaniciu et al. | |
| 2003/0194131 A1 | 10/2003 | Zhao et al. | |
| 2004/0098376 A1 | 5/2004 | Li et al. | |
| 2005/0240980 A1 | 10/2005 | Jun et al. | |
| 2006/0064411 A1 | 3/2006 | Gross et al. | |
| 2007/0055695 A1 | 3/2007 | Dorai et al. | |
| 2007/0101147 A1 | 5/2007 | Brunk et al. | |
| 2007/0136656 A1* | 6/2007 | Nydam | G06F 40/166 715/205 |
| 2008/0066136 A1 | 3/2008 | Dorai et al. | |
| 2008/0150431 A1 | 6/2008 | Preston | |
| 2008/0208828 A1 | 8/2008 | Boiman et al. | |
| 2010/0045799 A1 | 2/2010 | Lei et al. | |
| 2010/0082575 A1* | 4/2010 | Walker | G06F 16/48 707/706 |
| 2011/0052144 A1* | 3/2011 | Abbas | G11B 27/034 386/240 |
| 2011/0285748 A1 | 11/2011 | Slatter et al. | |
| 2013/0036124 A1 | 2/2013 | Ambwani et al. | |
| 2013/0156277 A1 | 6/2013 | Sasaki | |
| 2013/0290249 A1 | 10/2013 | Merriman et al. | |
| 2014/0047558 A1* | 2/2014 | Veerubhotla | G06F 21/105 726/28 |
| 2014/0324864 A1 | 3/2014 | Choe et al. | |
| 2014/0188840 A1 | 7/2014 | Agarwal et al. | |
| 2015/0254513 A1 | 9/2015 | Mansour et al. | |
| 2015/0269231 A1 | 9/2015 | Huynh et al. | |
| 2016/0019239 A1 | 1/2016 | Bastaldo-Tsampalis et al. | |
| 2016/0071242 A1 | 3/2016 | Uralsky et al. | |
| 2016/0253576 A1 | 9/2016 | Kilpatrick | |
| 2016/0275356 A1 | 9/2016 | Kuwahara et al. | |
| 2016/0323658 A1 | 11/2016 | Richardson | |
| 2017/0339238 A1 | 11/2017 | Qin | |
| 2018/0115788 A1 | 4/2018 | Burns et al. | |
| 2018/0376224 A1* | 12/2018 | Chun | H04N 21/4532 |

FOREIGN PATENT DOCUMENTS

| | | |
|---|---|---|
| JP | H10-84525 | 3/1998 |
| JP | H10-240774 | 9/1998 |
| JP | 2000056681 A | 2/2000 |
| JP | 2001024880 A | 1/2001 |
| JP | 2002-170104 | 6/2002 |
| JP | 2002-538642 | 11/2002 |
| JP | 2003-30204 | 1/2003 |
| JP | 2005-123824 | 5/2005 |
| JP | 2005346658 A | 12/2005 |
| JP | 2007-267294 | 10/2007 |
| JP | 2007-282268 | 10/2007 |
| JP | 2009-27564 | 2/2009 |
| JP | 2009-516257 | 4/2009 |
| JP | 2012199721 A | 10/2012 |
| JP | 2014-112280 | 6/2014 |
| JP | 2014-155190 | 8/2014 |
| JP | 2015-114685 | 6/2015 |

OTHER PUBLICATIONS

Extended European Search Report for EP Application No. 18156914.6, dated Apr. 4, 2018, 9 pages.
Extended European Search Report for EP Application No. 18158918.5, dated Apr. 4, 2018, 9 pages.
Office Action for U.S. Appl. No. 15/447,416, dated Mar. 29, 2018, 14 pages.
Apache, "Kafka 0.9.0 Documentation," documented on archive.org as of Nov. 20, 2015, https://web.archive.org/web/20151120080338/https://kafka.apache.org/090/documentation.html, 2015, 95 pgs.
Bligh, Alex, "What is Distributed Storage and Why Use It," Flexiant, Jul. 26, 2013, retrieved on Jun. 14, 2018 from http://www.flexiant.com, 4 pages.
Dittmann, et al., "Multimedia and Security," Workshop at ACM Multimedia '98, Bristol, UK, Sep. 12, 1998 (137 pages).
Lin et al., "Detection of Image Alterations Using Semi-Fragile Watermarks," Security and Watermarking of Multimedia Contents II. vol. 3971, International Society for Optics and Photonics, 2000 (12 pages).
Chang et al., "Robust Image Authentication Using Content Based Compression," Multimedia systems 9, No. 2 (2003): 121-130 (10 pages).
Atrey et al., "A Hierarchical Signature Scheme for Robust Video Authentication Using Secret Sharing," Multimedia Modelling Conference, 2004. Proceedings. 10th International. IEEE, 2004 (8 pages).
Lin et al., "Video and image watermark synchronization." Center for Education and Research in Information Assurance and Security (2005) (238 pages).
Wang et al., "A Video Watermarking Scheme Based on Motion Vectors and Mode Selection," Computer Science and Software Engineering, 2008 International Conference on. vol. 5. IEEE (5 pages).
Yang et al., "Research of Digital Watermarking Algorithm Based on SVD and DWT," Applied Mechanics and Materials. vol. 65. Trans Tech Publications, 2011 (4 pages).
Milano, "Content control: Digital watermarking and fingerprinting." White Paper, Rhozet, a business unit of Harmonic Inc., May 30 2012 (11 pages).
Rigoni et al., "Detecting tampering in audio-visual content using QIM watermarking." Information Sciences 328: 127-143, 2016 (17 pages).
Manaf et al., "Review of Robust Video Watermarking Methods for Copyright Protection Application," International Journal of Video &Image Processing and Network Security, vol. 16, No. 3, Jun. 2016 (8 pages).
Author Unknown, "Apache Kafka is a Distributed Streaming Planform. What Exactly Does that Mean?" dated Jul. 13, 2017, 2 pages, can be found at <http://kafka.apache.org/intro>.
Briefcam, BriefCam White Paper, White Paper: Video Synopsis Technology, 2010, 2 pages.
Kreps, "The Log: What Every Software Engineer Should Know about Real-Time Data's Unifying Abstraction," dated Jul. 13, 2017, 25 pages, can be found at <http://engineering.linkedin.com/distributed-systems/log-what-every-software-engineer-should-know-about-real-time-dates-unifying>.
Pritch et al., Clustered Synopsis of Surveillance Video, 6th IEEE Int. Conf. on Advanced Video and Signal Based Surveillance, Sep. 2-4, 2009, 6 pages.
Schneider, "What's the Difference Between Message Centric and Data Centric Middleware?" dated Jul. 6, 2012, 5 pages, can be found at <http://electronicdesign.com/embedded/whats-the-difference-between-message-centric-and-data-centric-middleware>.
Office Action for JP Application No. 2018-032691, dated Feb. 19, 2019, 10 pgs. (with translation).
Office Action for JP Application No. 2018-036253, dated Feb. 26, 2019, 7 pgs. (with translation).

(56) References Cited

OTHER PUBLICATIONS

Lin, "Watermarking and Digital Signature Techniques for Multimedia Authentication and Coypright Protection," internet citation, Jan. 1, 2000, retrieved from http://citeseerx.ist.psu.edu/viewdoc/summary?doi=10.1.1.32.5211, pp. 1-258.
Office Action for JP Application No. 2019-029024, dated Feb. 20, 2020, 10 pgs. (with translation).

\* cited by examiner

ND VIDEO
TAMPER PROTECTION AND VIDEO SOURCE IDENTIFICATION FOR VIDEO PROCESSING PIPELINE

CROSS REFERENCE TO RELATED APPLICATIONS

This application is a continuation-in-part of and claims priority to U.S. application Ser. No. 15/447,416, filed Mar. 2, 2017 entitled "Decomposition of a Video Stream into Salient Fragments," which is incorporated herein by reference in its entirety.

BACKGROUND

1. Field of the Invention

The specification generally relates to processing a video stream. In particular, the specification relates to a system and method for associating protection data with a video object and verifying the content and source of the video object based on the protection data.

2. Description of the Background Art

In video surveillance and similar applications, a camera typically monitors scenes that, for the most part, are uneventful, i.e., the scene contains ordinary or unchanging elements, and only seldom does an event of interest manifest in the scene. As a result, video browsing and retrieval is time consuming, and most recorded surveillance videos are never watched or examined.

Another problem relates to data security. The video data may be attacked when it is stored in a database or when it is transmitted from one place to another place. The stored video data can be destroyed by unwanted actions of unauthorized users or by destructive forces to the device that stores the data, which may be greatly reduced by improved management on users or other resources. Not only may the content of the video be manipulated, more importantly, the video data may not be traced back to its origination to verify the accuracy of the video data. Data security breaches may occur more often in frequent transmissions of video data.

SUMMARY

The techniques introduced herein overcome the deficiencies and limitations of the prior art, at least in part, with a system and method for associating protection data with a video object and verifying the content and source of the video object based on the protection data. In one embodiment, the system includes one or more processors and a memory storing instructions, which when executed cause the one or more processors to receive, at a producer, a video object and compute, at the producer, a digital signature based on content of the first video object. The instructions further cause the one or more processors to add, at the producer, identification information of the producer to the digital signature of the first video object, the producer being a source of the first video object, and transmit the first video object along with the digital signature from the producer to a first consumer. The instructions further cause the one or more processors to authenticate, at the first consumer, the content and source of the first video object based on the digital signature.

Other aspects include corresponding methods, systems, apparatuses, and computer program products for these and other innovative aspects.

The features and advantages described herein are not all-inclusive and many additional features and advantages will be apparent to one of ordinary skill in the art in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the accompanying figures in which like reference numerals are used to refer to similar elements.

DETAILED DESCRIPTION

Figure 1A:
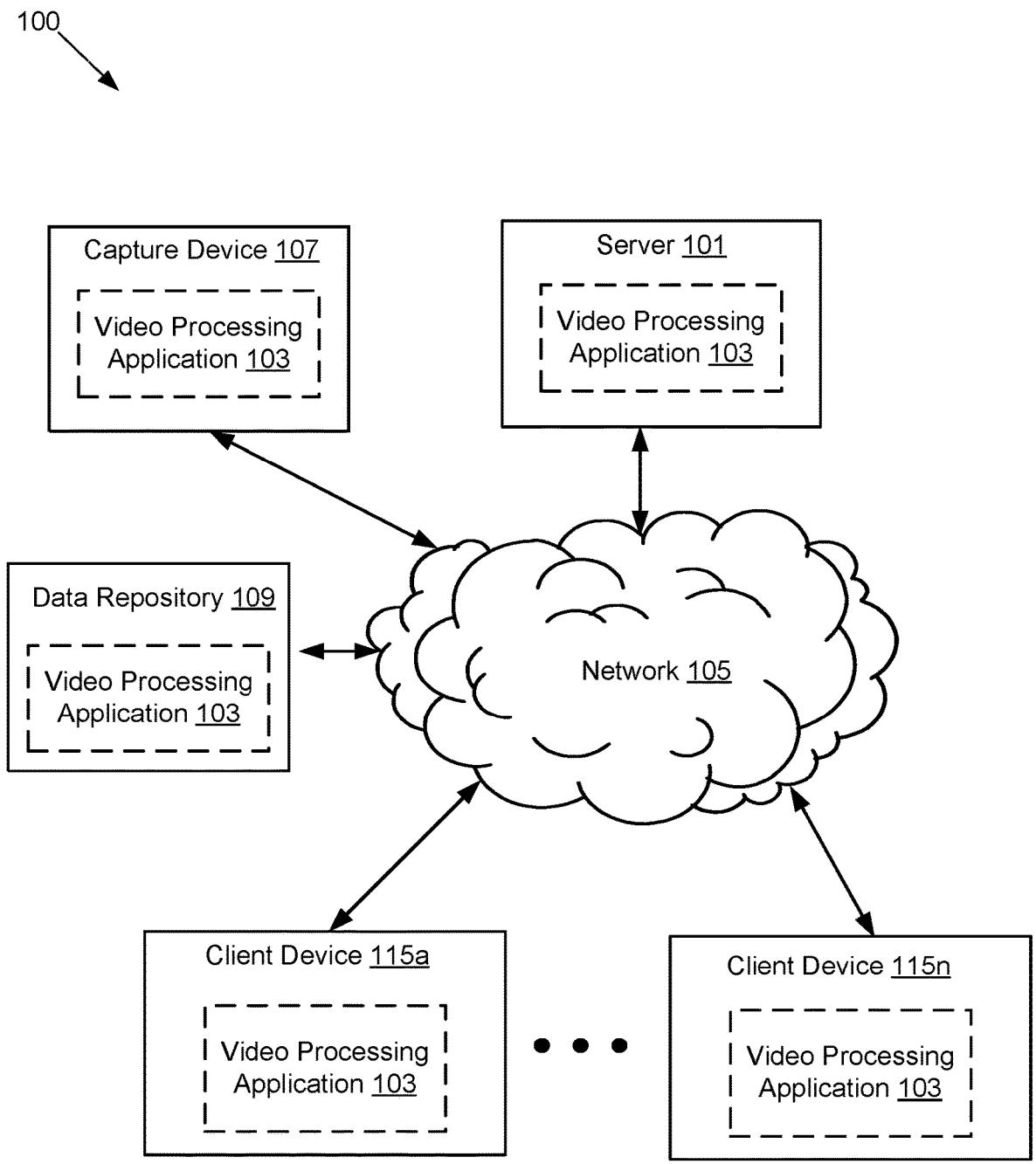
FIG. 1A depicts a high-level block diagram illustrating an example system for associating protection data with a video object and verifying the content and source of the video object based on the protection data.

FIG. 1A depicts a high-level block diagram illustrating one embodiment of a system 100 for associating protection data with a video object and verifying the content and source of the video object based on the protection data. The illustrated system 100 includes a server 101, a capture device 107, a data repository 109, and client devices 115a . . . 115n that are connected via a network 105. Although definite numbers of servers, capture devices, data repositories, and client devices are shown in FIG. 1A, it should be understood that there may be any number of such entities. Also, such entities can be connected by any number of networks. Further, in FIG. 1A and the remaining figures, a letter after a reference number, e.g., "115a," represents a reference to the element having that particular reference number. A reference number in the text without a following letter, e.g., "115," represents a general reference to instances of the element bearing that reference number.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including short messaging service (SMS), multimedia messaging service (MMS), hypertext transfer protocol (HTTP), direct data connection, WAP, email, etc.

A client device 115 is a computing device including a processor, a memory, applications, a database, and network communication capabilities. For example, client device 115 can be a laptop computer, a desktop computer, a tablet computer, a mobile telephone, a personal digital assistant (PDA), a mobile email device, a television with one or more processors embedded therein or coupled thereto or any other electronic device capable of accessing the network 105 and communicating with the server 101, the capture device 107, or the data repository 101. In some embodiments, client device 115 communicates with other entities of system 100 via the network 105 for providing functionality described herein. For example, client device 115 sends a request for video content. Responsive to the request, the server 101 generates the video content and provides the video content to client device 115. Further, the client device 115 presents the video to a user and receives user input regarding a portion of the video from the user.

The capture device 107 is a hardware device that captures video and associates metadata with the video. For example, the capture device 107 can be a digital video camera, a web cam, an IP camera, etc. The video captured by the capture device 107 can be any series of time-related images. The capture device 107 associates metadata with the video, for example, a time and a location at which the video was captured, an image size, an image resolution, color depth, a frame rate, etc.

The data repository 109 is a facility designated for storing data, for example, digital media such as videos. For example, the data repository 109 can be a data storage facility, a cloud storage, a database, etc. In some embodiments, the data repository 109 provides videos upon a request for the videos from the client device 115.

In some embodiments, the client device 115, the capture device 107, and/or the data repository 109 are capable of invoking applications, running software programs, or performing other analytics logic. For example, the capture device 107 may be a smart capture device that may run a video processing application to perform image recognition on the captured video. In some embodiments, the client device 115, the capture device 107, and/or the data repository 109 perform the video processing functions of the server 101 running video processing application 103, described below.

The server 101 may be either a hardware server, a software server, or a combination of software and hardware servers. The server 101 may be, or may be implemented by, a computing device including a processor, a memory, applications, a database, and network communication capabilities. The server 101 performs video analytics on a video stream. In some embodiments, the server 101 is capable of invoking applications and running software programs to perform video analytics on content management, security management, etc. For example, the server 101 may use an application to manage the video content based on identification, correlations, aggregations, filtering, and sampling, etc. The server 101 may identify features from the video stream, recognize objects from the video stream based on the features, and select portions of the video stream to generate rich video content. The server 101 may also run an enhancer program to improve the quality of the video stream. In another example, the server 101 may provide a solution for security management by adding authentication data and video identifiers to a video object to determine whether the video object is originated from a particular source and whether the video object has been tampered with or altered during transmission of the video object to a destination.

In some embodiments, the server 101, the client device 115, the capture device 107, and/or the data repository 109 include a video processing application 103. In some embodiments, the video processing application 103 can be implemented using programmable or specialized hardware. In some embodiments, the video processing application 103 can be implemented using a combination of hardware and software. In other embodiments, the video processing application 103 may be software stored and executed on the server 101, the client device 115, the capture device 107, and/or the data repository 109.

In some embodiments, the video processing application 103 receives a video from a capture device and decomposes the video into fragments. In some embodiments, the video processing application 103 determines saliency of objects based on at least one of motion detection, contrast, color, and semantic properties, and decomposes a video into fragments based on the saliency. A salient fragment of the video is a subset of frames of the video and a subset of pixels from the subset of frames. For example, pixels corresponding to an object in the video may be found in multiple frames of the video. These frames with the pixels corresponding to an object may be extracted from the video as a subset of frames. Further, the pixels corresponding to the object (and in some embodiments, some pixels surrounding the object) are extracted from each of the subset of frames. The resulting subset of frames including only the pixels associated with the object is a salient fragment. In some embodiments, the video processing application 103 also creates a video composition using a set of fragments responsive to receiving a user query. The video composition is a summarization of a video, which includes richer content in a shorter time duration than the original video.

The video processing application 103 provides tamper protection and source identification to a video fragment and/or a video composition. For example, the video processing application 103 associates, at a source, a digital signature with a video fragment or embeds a watermark into the video fragment before transmitting the video fragment to a destination, and authenticates, at the destination, the video fragment based on the digital signature or the watermark to determine whether the video fragment has been altered during the transmission and the source of the video fragment.

In addition to providing more concise, more relevant video data that suits a user's need, the techniques described herein improve data and transmission security by marking the video data with additional protection data at various stages of a video processing pipeline and uses the protection data to ensure the integrity of the video data and identify the source of the video data. The operation of the video processing application 103 and the functions listed above are described below in more detail with reference to FIGS. 1B-5.

Figure 1B:
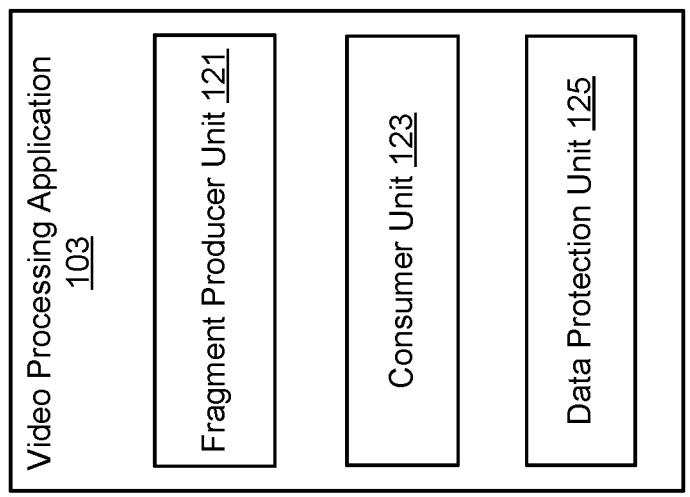
FIG. 1B depicts a block diagram illustrating an example video processing application.

FIG. 1B depicts a block diagram illustrating one embodiment of a video processing application 103 that is included in the server 101, the capture device 107, the data repository 109 or the client device 115 of system 100. In the illustrated embodiment, the video processing application 103 includes a fragment producer unit 121, a consumer unit 123, and a data protection unit 125.

The fragment producer unit 121 generates or produces video fragments. A fragment is a subset of a video that includes multiple time-related images or frames of the video. In some embodiments, the fragment producer unit 121 produces fragments by processing an incoming video. For example, the server 101, the capture device 107, and the client device 115 may include a fragment producer unit 121 for generating video fragments. In other embodiments, the fragment producer unit 121 returns fragments from the data repository 109 as a response to a query.

In some embodiments, the fragment producer unit 121 may include software and/or logic to provide the functionality for decomposing a video into fragments. The video can be any series of time-related images. A fragment or fragment sequence is a subset of the video that includes multiple time-related images or frames of the video. Each frame of the fragment at a time instant includes a particular region that is slightly different and is connected in a certain continuity. For example, a salient fragment may include three time-related frames of an activity of waving hands. The first frame shows that a man is raising a hand to a first position. The second frame shows that the man is waving the hand at the first position. The third frame shows that the man is lowering the hand to a second position. A single salient fragment does not necessarily include a dramatic change of the particular region. That is, a salient fragment represents a sequence of small and/or steady changes in activity. Once the dramatic change occurs, for example, the region gets fractured, occluded, etc., a new salient fragment starts. For example, the salient fragment described above includes only three frames because the fourth frame that follows the third frame in the video does not contain the man's hand. In other words, a salient fragment is an atom of the original video that starts when a block of pixels appears in a scene and ends when the block of pixels disappears from the scene. In some embodiments, the fragment producer unit 121 may include an encoder to perform the functionality described herein.

In some embodiments, the fragment producer unit 121 determines saliency of objects, extracts salient objects from the video based on the saliency, and generates a plurality of salient fragments based on the salient objects. The saliency represents a pronounced feature of the video, and the corresponding salient fragment is a highlight of the video with noticeable quality that shows the pronounced feature. For example, the fragment producer unit 121 extracts, from a surveillance video, a salient fragment including movements of a suspect, based on the most pronounced feature being a blacklisted individual (i.e., the salient object).

In some embodiments, the fragment producer unit 121 determines saliency of objects in a video based on at least one of motion detection, contrast, color, and semantic properties. A salient object therefore may be an object that is moving or an object that is of certain color or certain contrast. The salient object may also be an object with semantic significance. For example, for a conversation video, the fragment producer unit 121 may determine the person who did the most talking (e.g., answers other people's questions) as a salient object based on the semantic significance. Or, for example, the fragment producer unit 121 may determine a car with a certain label as an object with semantic significance.

In some embodiments, the fragment producer unit 121 uses a background and foreground separation method based on motion detection to identify a moving object as a salient object. For example, the fragment producer unit 121 extracts a salient object of a train heading to a train station (e.g., the fast-changing portion) from a video, or the fragment producer unit 121 identifies a moving object that is not in a predominant flow of moving objects in the video as a salient object. Motion detection methods may not be applicable in extracting salient objects when there are numerous moving objects in a scene, for example, a busy highway, a crowded store, etc. In such cases, the fragment producer unit 121 may determine a salient object based on other characteristics of the video such as the contrast, the color, the shape, the semantic information of the video, etc. For example, the fragment producer unit 121 identifies a person riding a bike as a salient object based on the semantic information including activities performed by objects in the video. The algorithms used in identifying salient objects include a Gaussian Mixture Models (GMM) based algorithm, a visual background extractor (ViBe), an adaptive GMM, a self-organizing map algorithm, a principal component analysis algorithm, an algorithm based on low-rank decomposition for modelling background, etc.

Once a salient object is determined, the fragment producer unit 121 links the related portions of the salient object to generate a fragment. In some embodiments, the fragment producer unit 121 determines salient objects in each frame of the video, tracks each salient object over the length of the video, and generates a plurality of fragments based on the tracks. A simple way to track the salient object is to locate the position of the salient object from one frame to another frame, and associate the salient object in one frame to the salient object in the next frame that appears at a similar spatial location. However, this simple tracking method has some problems such as overlapping objects, false detection and resulted lack of association between objects, etc. To solve the problems, the fragment producer unit 121 may use a tracking algorithm that associates a specific color model and/or a motion vector model to a salient object to obtain a track of the salient object over time. In some embodiments, the fragment producer unit 121 applies a Hungarian method to determine when to start and stop tracks, and uses a Kalman filter method to implement multiple object tracking.

In some embodiments, the fragment producer unit 121 defines a track of a salient object as a fragment. This video fragment includes only the salient portion of the video and lasts for the time duration of the track, and is therefore also referred to as a salient fragment. The salient fragment is a portion of the video for a single salient activity localized in time and space. In some embodiments, the fragment producer unit 121 tracks a single salient object within a certain time period of the video, and generates a single salient fragment from this specific time period. In other embodiments, the fragment producer unit 121 tracks multiple salient objects within a certain time period of the video, and generates multiple salient fragments from this specific time period of the video. For example, the fragment producer unit 121 may track, from a three-minute period of the video, a person and a car, and generate a first fragment of the person and a second fragment of the car. In some embodiments, a fragment may even encompass an entire video.

Once the fragments are determined, the fragment producer unit 121 communicates with other components of the video processing application 103 to build a database of fragments. In some embodiments, a database index is built in the database of fragments for fast data retrieval based on a spatio-temporal overlap or causality information of the fragments. In other embodiments, the fragment producer unit 121 may also communicate with other components of the video processing application 103 (e.g., the consumer unit 123) to identify and provide video content to a user.

In some embodiments, the database of fragments may reside on the data repository 109 and be accessible to the fragment producer unit 121 to return fragments as a response to a query. For example, the fragment producer unit 121 may return fragments within a time interval to a user based on a time input from the user. Or the fragment producer unit 121 may identify fragments corresponding to a direction of motion and return the identified fragments to a user.

The consumer unit 123 consumes or uses the fragments generated by the fragment producer unit 121. The consumer unit 123 may be the database of fragments on the data repository 109 that receives fragments from the fragment producer 121 and updates the database itself. The consumer unit 123 may be a graphical user interface component (not shown) of the client device 115 or the capture device 107 that displays the fragments. The consumer unit 123, which resides on the server 101, the capture device 107 or the client device 115, receives fragments from the database of fragments and creates a video composition. The video composition is a summarization of a video, which may be different from the video in that: 1) the video composition is responsive to a user query and emphasizes the information of the original video that corresponds to the fragments related to the query, and/or 2) the video composition is shorter than the original video in time length. Because the video composition includes richer content in a shorter time duration than the original video, user's time and network bandwidth for obtaining useful information from a video are reduced by using the video composition.

In some embodiments, the consumer unit 123 receives a query relating to a video based on a user input. The query can be a fragment, a time interval, or an attribute associated with the fragment. Responsive to the query, the consumer unit 123 generates a video composition based on a set of fragments and other related information such as non-salient portions of the video, time-shift information, weights associated with the fragments, spatial-shift information, etc. For example, the consumer unit 123 retrieves all fragments of a video that occur within a time interval, and generates a video composition based on these fragments and start stop times associated with the fragments. One challenge in generating a video composition is to retain causal interactions in the video. The consumer unit 123 cannot rearrange causal interactions in the video without regard to ordering of various fragments. As a result, the consumer unit 123 may factor a connectivity graph that indicates the casual relationships between fragments into the generation of the video composition. The consumer unit 123 also uses other factors such as time-shift information, weights associated with the fragments, spatial-shift information, etc., for other optimization purposes when generating a video composition.

In some embodiments, the consumer unit 123 may generate hierarchical video compositions. The consumer unit 123 retrieves, from a plurality of fragments extracted from a video, a first set of fragments based on a first query to generate a first video composition (e.g., including a first person and a second person). The consumer unit 123 may then retrieve, from the first set of fragments, a second set of fragments based on a second query to generate a second video composition (e.g., including only the second person), and so on. In addition to the hierarchical video compositions, the consumer unit 123 generates dynamic video compositions. For example, for a query of a first fragment of a video, the consumer unit 123 may determine that various sets of fragments are related to the query based on the analysis focusing on different objects in the first fragment, and generates various video compositions based on the various sets of fragments. By providing various video compositions, the current approach suits the user's various needs especially when the user's intention of querying an image of the video is unclear.

It is particularly advantageous that the consumer unit 123 can dynamically generate video compositions based on queries. There exist approaches that create a short video summary (e.g., a video synopsis) to summarize a scene over a time period of a long video. For example, these approaches may generate video synopses with different time lengths (e.g., a two-minute video synopsis, a 10-minute video synopsis) for a one-hour video and return a video synopsis with a certain length to a user upon a user query. However, such approaches may only build an index after generating the result instead of before generating the result as described in this disclosure, for example, these approaches index and store the query result (e.g., the video synopses) rather than portions of images that are used to generate the query result. Therefore, if a number of video synopses with different time lengths were generated, indexed, and stored in a database, and a user queries for a video synopsis with a certain length, these approaches will search the database based on the index and return the video synopsis with the certain length to the user. The existing approaches always provide the same video synopsis to the user based on the certain time length, which is not dynamic. In contrast, the approach described in this disclosure is more flexible, more efficient, and more fit to the user's need.

The data protection unit 125 protects the video fragments and the video compositions at different stages of a video processing pipeline. The video processing pipeline includes a process of generating, processing, transmitting and presenting the video fragments and the video compositions. An example video processing pipeline will be described in detail with reference to FIGS. 3A and 3B. In some embodiments, the data protection unit 125 protects a fragment against malicious intrusions or tampering. The intrusions or attacks may cause the fragment to be altered in different manners. The fragment may be temporally altered, i.e., one or more frames of the fragment are skipped or duplicated. Or the fragment may be spatially altered in that pixels in each frame of the fragment being manipulated. Or the fragment may be spatio-temporally altered, i.e., both temporally altered and spatially altered. In other embodiments, the data protection unit 125 also records or modifies the source of a fragment when it is transmitted to a destination such that its source can be traced back at the destination. Similarly, the video composition is tamper protected and marked to indicate its source by the data protection unit 125.

Figure 2:
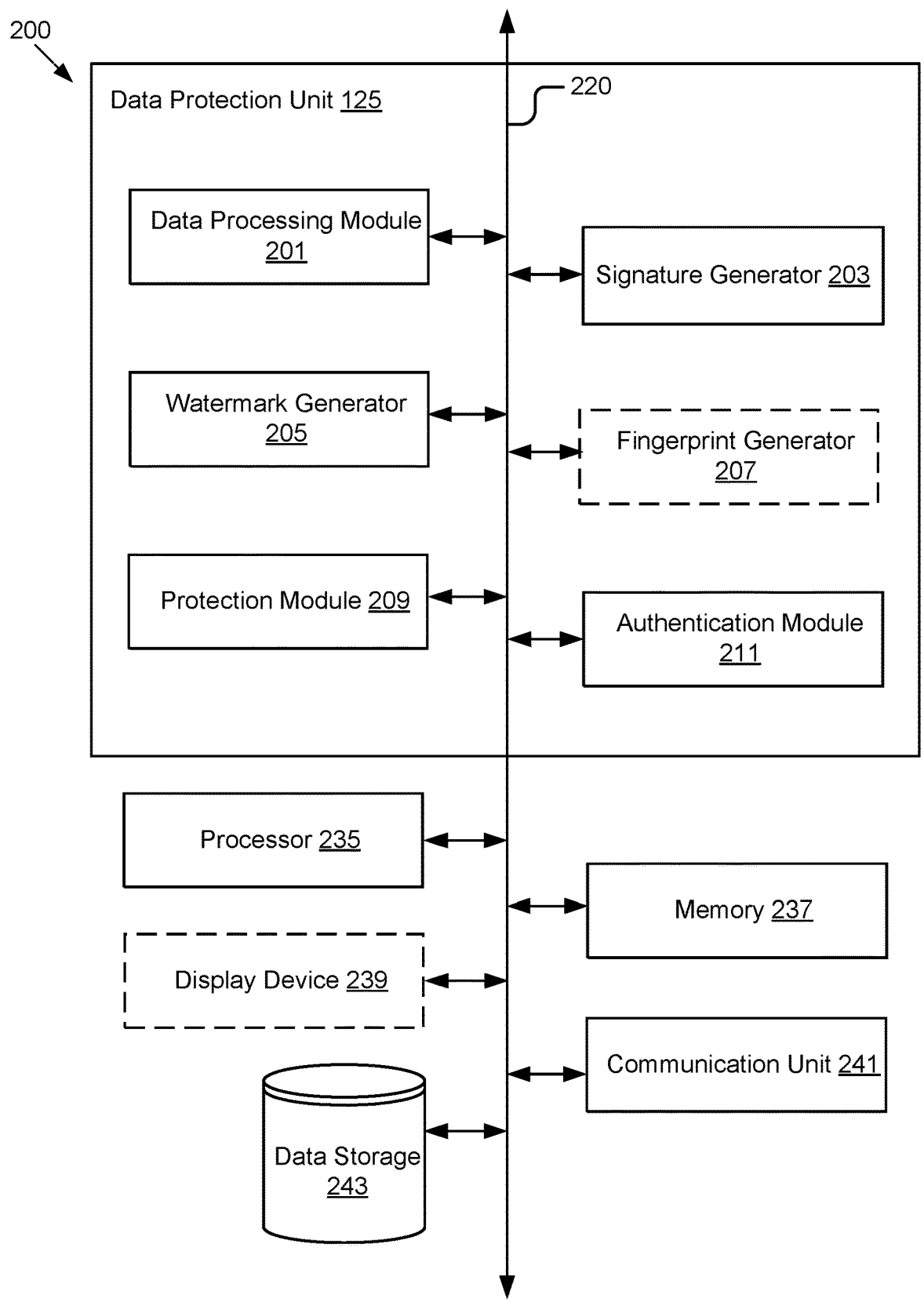
FIG. 2 depicts a block diagram illustrating an example data protection unit.

FIG. 2 depicts a block diagram illustrating one embodiment of a system 200 (e.g., server 101, capture device 107, data repository 109, or client device 115) including a data protection unit 125. The system 200 may also include a processor 235, a memory 237, an optional display device 239, a communication unit 241, and data storage 243 according to some examples. The components of the system 200 are communicatively coupled to a bus 220 for communication with each other.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of user interfaces used in receiving a user request for video content, identifying and providing the requested video content to a user, etc. In some implementations, the processor 235 may be coupled to the memory 237 via the bus 220 to access data and instructions therefrom and store data therein. The bus 220 may couple the processor 235 to the other components of the system 200 including, for example, the memory 237, the communication unit 241, the video processing application 103, and the data storage 243. It will be apparent to one skilled in the art that other processors, operating systems, and physical configurations are possible.

The memory 237 may store and provide access to data for the other components of the system 200. In some implementations, the memory 237 may store instructions and/or data that may be executed by the processor 235. The instructions and/or data may include code for performing the techniques described herein. For example, in one embodiment, the memory 237 may store the video processing application 103. The memory 237 is also capable of storing other instructions and data, including, for example, an operating system, hardware drivers, other software applications, databases, etc. The memory 237 may be coupled to the bus 220 for communication with the processor 235 and the other components of the system 200.

The memory 237 may include one or more non-transitory computer-usable (e.g., readable, writeable) device, a dynamic random access memory (DRAM) device, a static random access memory (SRAM) device, an embedded memory device, a discrete memory device (e.g., a PROM, EPROM, ROM), a hard disk drive, an optical disk drive (CD, DVD Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images and data as described herein. In different embodiments, the display is binary (only two different values for pixels), monochrome (multiple shades of one color), or allows multiple colors and shades. The display device 239 is coupled to the bus 220 for communication with the processor 235 and the other components of the system 200. It should be noted that the display device 239 is shown in FIG. 2 with dashed lines to indicate it is optional. For example, the system 200 may be a server for performing video content analysis without a display device 239 or a smart capture device without a display.

The communication unit 241 is hardware for receiving and transmitting data by linking the processor 235 to the network 105 and other processing systems. The communication unit 241 receives data for processing. For example, the communication unit receives video data from the capture device 107 for processing by the video processing application 103. The communication unit 241 may also transmit information to a client device 115 for display. For example, the communication unit 241 receives a request for video content from a user of the client device 115, and transmits the video content to the client device 115 via the video server 121. The communication unit 241 is coupled to the bus 220. In one embodiment, the communication unit 241 may include a port for direct physical connection to the network 105. In another embodiment, the communication unit 241 may include a wireless transceiver (not shown) for exchanging data with the client device 115 or any other communication channel using one or more wireless communication methods, such as IEEE 802.11, IEEE 802.16, Bluetooth®, cellular communications, or another suitable wireless communication method.

The data storage 243 is a non-transitory memory that stores data for providing the functionality described herein. In the illustrated embodiment, the data storage 243 is communicatively coupled to the bus 220 to receive data for storage and provide data for retrieval upon a request for the data. The data storage 243 may store a video, a video object, a digital signature, a watermark, etc. In some embodiments, the data storage 243 also includes a database of fingerprints.

In some embodiments, the data protection unit 125 includes a data processing module 201, a signature generator 203, a watermark generator 205, a fingerprint generator 207 (optional), a protection module 209, and an authentication module 211.

The components of the data protection unit 125 may include software and/or logic to provide the functionality they perform. In some embodiments, the components can be implemented using programmable or specialized hardware including a field-programmable gate array (FPGA) or an application-specific integrated circuit (ASIC). In some embodiments, the components can be implemented using a combination of hardware and software executable by processor 235. In some embodiments, the components are instructions executable by the processor 235. In some implementations, the components are stored in the memory 237 and are accessible and executable by the processor 235.

The data processing module 201 may include software and/or logic to provide the functionality for receiving data of a video object (e.g., a video fragment or a video composition) from a fragment producer unit 121 or a consumer unit 123, and transmitting the video data to an appropriate module and/or generator for further processing. For example, the data processing module 201 may send a video composition embedded with a watermark to the authentication module 211 to authenticate the content and the source of the video composition. In some embodiments, the data processing module 201 determines whether there is authentication data or protection data associated with the received video data. If there is no authentication data, the data processing module 201 communicates with the generators 203, 205, 207 and the protection module 209 to provide tamper protection and video object source identification over the video data by associating the authentication data to the video object. Otherwise, the data processing module 201 sends the video object along with the authentication data to the authentication module 211 for authentication purpose.

The signature generator 203 may include software and/or logic to provide the functionality for generating a digital signature for a video object. The digital signature is used in tamper protection, i.e., protecting the video object from malicious instructions or tampering.

The signature generator 203 computes a digital signature based on content of the video object. In some embodiments, the signature generator 203 generates the digital signature based on features related to video images such as edges, corners, or some other robust features dependent on the image content. In other embodiments, the signature generator 203 computes the digital signature based on discrete cosine transform coefficients or discrete wavelet transform coefficients that help separate the video image into parts (or spectral sub-bands) of differing importance (with respect to the image's visual quality). In other embodiments, the signature generator 203 generates the digital signature based on features or coefficients extracted from image blocks of the frames of the video and/or a temporal transform applied to a group of frames of the video. In some other embodiments, the signature generator 203 may also generate digital signatures hierarchically based on deriving the signatures from a group of frames of the video, and combine the signatures to get a master signature for the entire video.

In some embodiments, the signature generator 203 generates a digital signature as a separate file or header information that is transmitted along with a video object to authenticate the content of the video object. In order to authenticate the video content, the digital signature has to be sensitive to content-changing modifications of the video object but not necessarily to content-preserving modifications. A content preserving modification may include a modification that does not affect the overall content of a video object, e.g., a video encapsulation, and therefore does not need to be detectable when compared to the digital signature of the video. However, if the video object is modified to add, remove, or move pixels, or is modified to drop or duplicate some fragments of the video fragments, this modification is a content changing modification, and needs to be detectable when compared to the digital signature. In some embodiments, the signature generators 203 additionally uses control data regarding an image block within a frame, the frame, or a group of frames in generating the digital signature. The added complexity of using control data allows the signature to be more sensitive to the content-changing modifications and more efficient in detecting the content-changing modifications.

In some embodiments, the signature generator 203 sends the digital signature to the protection module 209 and the authentication module 211 for verifying the video content. In other embodiments, the signature generator 203 also communicates with the protection module 209 to add identification information of the source of a video object to the digital signature such that both the video content and the source of the video object can be verified. In some other embodiments, the signature generator 203 stores the digital signature in the data storage 243.

The watermark generator 205 may include software and/or logic, to provide the functionality for generating a watermark for a video object. When embedded in the video object, a watermark can be used to determine whether the video object is originated from a known source and whether the video object has been tampered with or altered.

A watermark may be a fragile watermark, a semi-fragile watermark, or a robust watermark. The fragile/semi-fragile watermark usually deteriorates when the video object is altered or attacked. However, the robust watermark is designed to be detectable even after the watermarked video object has been attacked, because the robust watermark remains unchanged when the video object is changed in resolution, contrast, or re-encoded. For example, the robust watermarking can survive general operations such as compression, adding noise, filtering, etc., as well as geometric attacks such as rotation, scaling translation, shearing, etc. In some embodiments, the fragile watermark is used to determine whether a video object is altered, while the robust watermark is used to verify the source of the video object. The semi-fragile watermark, on the other hand, can work as a video identifier for the source of the video object as well as authentication data for the content of the video object.

In some embodiments, the watermark generator 205 includes a pseudo-random number generator. The pseudo-random number generator is associated with an embedding key that may be a seed to the pseudo-random number generator. The watermark generator 205 generates a fragile/semi-fragile watermark based on the original video using the pseudo-random number generator and the key. In some embodiments, the watermark generator 205 also uses or embeds digital hashes when generating a fragile watermark.

In some embodiments, the watermark generator 205 generates a semi-fragile watermark. For example, the watermark generator 205 constructs the watermark as a signal with the same size or dimensions as the original image. In one embodiment, the watermark generator 205 performs a discrete cosine transform on the watermark using only the middle and low frequencies. Once the watermark has been constructed in the discrete cosine transform domain, the watermark generator 205 applies the inverse discrete cosine transform to the watermark to produce a spatial domain watermark. The watermark generator 205 then communicates with the protection module 209 to insert the spatial domain watermark into the original frame via additive embedding. The watermark generated in the spatial domain correlates pixel value differences in the spatial domain, and is therefore useful in determining the spatial alteration. In some embodiments, the watermark generator 205 also creates a temporal watermark and synchronizes the temporal watermark with the video object to determine or protect the video object against temporal alterations.

In some embodiments, the watermark generator 205 also generates a watermark, such as a robust watermark, to at least include the information regarding the owner or source of a video object. In the case of the video object being a video composition, the watermark payload may contain the query that initiated the creation of the video composition. A person skilled in the art may realize that other information helpful for authentication of a video object can also be used to generate a watermark or included in the watermark.

The watermark generator 205 may generate invisible or visible watermarks. In one embodiment, the watermark generator 205 generates invisible watermarks such that the video object with the embedded watermark is perceptually indistinguishable from the original video object. However, since the video source identification does not require a watermark to be invisible, the watermark generator 205 may also generate a visible watermark.

In some embodiments, the watermark generator 205 sends the watermark to the protection module 209 and the authentication module 211 for verifying the video content and/or video source. In other embodiments, the watermark generator 205 also stores the watermark in the data storage 243.

The fingerprint generator 207 may include software and/or logic to provide the functionality for generating a fingerprint for a video object. The fingerprint is a compact digital representation of the video object that summarizes the unique characteristics of the video object. The fingerprint can be used to determine the legitimacy of the video object, e.g., whether the video object has been modified.

In some embodiments, the fingerprint generator 207 extracts some information that is unique to a video object and creates the fingerprint of the video object when the video object is created. As a result, the fingerprint generator 207 is depicted in a dash-lined box to indicate that it could be part of the fragment produce unit 121 or the consumer unit 123 that generates the fingerprint when the video fragment or the video composition is created. The fingerprint generator 207 stores the fingerprint in a database of fingerprints. The stored fingerprint is compared to a fingerprint associated with an input video object to determine the legitimacy of the input video object.

In some embodiments, the fingerprint generator 207 generates video fingerprints that are resolution and format independent. The fingerprint generator 207 communicates with the protection module 209 and the authentication module 209 to identify complete videos, portions of videos, and even short snippets of videos. In some embodiments, the fingerprint generator 207 also uses fingerprints to spot video content that has been manipulated.

The protection module 209 may include software and/or logic to provide the functionality for associating protection data with a video object to secure the video data. In some embodiments, the protection data includes authentication data and video identifier(s). The authentication data is added to provide tamper protection for the video object. The video identifier(s) is added for video object source identification. The authentication data and the video identifier include the digital signature, the fragile/semi-fragile watermark, the robust watermark, and the fingerprint respectively generated by the signature generator 203, the watermark generator 205, and the fingerprint generator 207.

Tamper protection is to protect a video object from malicious intrusions or tampering. The intrusions may cause alteration of the video object such as skipped or duplicated frames, or manipulated (e.g., added, moved, removed) pixels in a frame. The protection module 209 associates the authentication data to an original video object for tamper protection because the authentication data can be analyzed to detect if the video content is modified either spatially or temporally.

As described above, the video modification may be classified as a content preserving modification or a content changing modification. The content preserving modification includes a modification that does not affect the overall content of a video, e.g., a video encapsulation, and therefore does not need to be detected by the authentication data added to the video. However, if the video is modified to add, remove, or move pixels, or is modified to drop or duplicate some fragments of the video fragments, this modification is a content changing modification. The authentication data should be able to reflect and detect the content changing modification. In some embodiments, the authentication data used for tamper protection includes either a digital signature or a fragile/semi-fragile watermark.

In some embodiments, the protection module 209 receives a digital signature from the signature generator 203, associates the digital signature to a video object as an ancillary portion, and sends this ancillary portion as a separate file or header information along with the video object to a verification end or a destination (e.g., a consumer) to authenticate the content of the video object. In other embodiments, the protection module 209 may also add identification information of the source of the video object (e.g., a fragment producer unit that creates a fragment or a consumer that generates a video composition) to the digital signature such that not only the content of the video object but also the source of the video object can be authenticated based on the digital signature.

In some embodiments, the protection module 209 encrypts the signature using a private key generated along with the video object before distributing the video object. The protection module 209 also notifies the authentication module 211 to use a public key paired with the private key to detect tampering when verifying the video object at the video consumer.

Since the protection module 209 associates the digital signature, generated from the original data of the video object, with the video object, the authentication module 211 may not use this digital signature to authenticate the new data of the video object (e.g., a newer version) if the original frame is tampered with. Also, since the protection module 209 separates a digital signature from the signal or the video object to be authenticated, keeping the signature and signal together may be cumbersome and the signature may be prone to becoming lost. Further, although a digital hash or signature can easily identify an altered video object, locating the alteration within the video object requires significantly more effort.

In other embodiments, the protection module 209 cooperates with the watermark generator 205 to embed a fragile/semi-fragile watermark within a video object before transmission of the video object. In some embodiments, the protection module 205 uses additive embedding, multiplicative embedding, quantization embedding, or other fragile watermarking techniques to insert the watermark into the video object, for example, the least significant bit (LSB) plane of the video data.

The protection module 209 embeds the content-fragile watermarks in the video data. Once the video data is manipulated, these watermarks will also be modified such that the authentication system can examine them to verify the integrity of data. This property of fragile watermarks is useful for authentication applications, where the objective is to provide confidence that a video object or a signal (1) is originated from a known source, and (2) has not been tampered or altered. However, the fragileness of the fragile watermark may be too sensitive (e.g., too easy to be modified) for some applications, the fragile watermark is sometimes preferred for content verification rather than source verification. In contrast, a semi-fragile watermark is capable of tolerating some degree of change to the watermarked video object, such as the addition of quantization noise from lossy compression. These transformations do not substantially affect the use of the semi-fragile watermarking in both video object content authentication and video object source identification. As compared to the digital signature, both fragile watermarking and semi-fragile watermarking are able to not only detect the content-changing alterations to the video object but are also capable of locating the alterations, both in space and time.

In addition to protecting the video object from intrusions and tampering, the protection module 209 also adds video identifier(s) to the video object for video object source attribution or identification. The video object source attribution is about verifying the identity and source of video fragments and video compositions. In some embodiments, the protection module 209 communicates with the authentication module 211 to use either a watermark, a fingerprint, or a digital signature to ensure that a video object is correctly attributed to its source.

In some embodiments, the protection module 209 embeds a watermark into a video object. For example, the protection module 209 may embed the watermark using an embedding key and a pseudo-random number generator. The video object is then transmitted to a verification end or a destination, where the source or the producer of the video object can be determined by the authentication module 211 based on analyzing the watermark. Particularly, a watermark may be useful in tracking individual assets, identifying the creator of a particular piece of content, determining whether content was obtained by legitimate means, etc. To achieve this functionality, the watermark should remain unchanged when the original video object is slightly modified. The slight modification may include a change in resolution, enhancement of contrast, re-encoding, etc. Since a fragile watermark may be sensitive to such modifications, in some embodiments, the protection module 209 uses the robust watermark in video object source identification.

In some embodiments, the protection module 209 embeds the robust watermark inside motion vector regions of video frames with H.264 format. In other embodiments, the protection module 209 uses discrete wavelet transform and singular value decomposition to embed the robust watermark. For example, the protection module 209 allows the watermark to go through a discrete wavelet transform process, and then applies singular value decomposition on each band. The protection module 209 embeds the singular values of certain frequency bands of the watermark into the coefficients of corresponding singular value of the original image. One skilled in the art should recognize that the protection module 209 may use other approaches to embed a robust watermark into a video object.

One advantage of watermarking is that a watermark (e.g., a semi-fragile watermark, a robust watermark, etc.) can be used in both tamper protection and video object source identification. Another advantage of watermarking is that the protection module 209 can embed ancillary information (e.g., the fragment identifiers used to generate a particular video composition) into the watermark to increase the accuracy and speed of both tamper protection and video object source identification.

In other embodiments, the protection module 209 cooperates with the fingerprint generator 207 to identify a fingerprint of a video object from a database of fingerprints as a video identifier of the video object for video object source identification. To do so, the protection module 209 accesses the fingerprint database in order to determine the legitimacy of the video object. Also, the protection module 209 is unable to embed further ancillary information into the video object.

The authentication module 211 may include software and/or logic to provide the functionality for authenticating a video object after the transmission of the video object, i.e., at a destination or a verification end.

In some embodiments, the authentication module 211 uses the authentication data to determine whether the video object has been tampered with or altered during the transmission. In some embodiments, the authentication module 211 receives an encrypted digital signature transmitted along with the video object and decrypts the received digital signature using a public key. This public key is paired with the private key used by the protection module 209 to encrypt the original signature. The authentication module 211 determines whether the decrypted digital signature has been changed from the original digital signature. In some embodiments, the authentication module 211 retrieves this original digital signature from a signature database. If the decrypted digital signature is changed, the authentication module 211 determines the that video object has been attacked. In other embodiments, the authentication module 211 receives a video object embedded with a watermark (e.g., a fragile/semi-fragile watermark) and retrieves the watermark. If the watermark is present and can be extracted, i.e., the retrieval succeeds, the authentication module 211 determines that the video object has not been tampered with. The watermark is detectable only if the video object was unmodified during transmission. Usually the authentication module 211 uses the same embedding key that was used to create the original watermark to retrieve the watermark from the video object at the verification end. The authentication module 211 may also use other detection techniques to retrieve or extract the watermark. In the case of the semi-fragile watermark example described above, where the watermark generator 205 generates a spatial domain watermark, the authentication module 211 may detect this watermark based on the differences of adjacent pixel values in the spatial domain.

Using watermarking, the authentication module 211 not only determines whether a video object has been tampered with or altered during transmission, but also determines whether the video object is originated from a known source. For example, the authentication module 211 may recover a robust watermark embedded in the video object using the same embedding key that was used to create the watermark, i.e., the watermark is encrypted and decrypted symmetrically. The authentication module 211 may also have the watermark separately decrypted to make it asymmetric from the encryption. As long as the recovery is successful, the authentication module 211 determines that both the source of the video object and the integrity of the video object are authenticated. In some embodiments, the authentication module 211 also compares a fingerprint associated with a received video object to a fingerprint stored in a database of fingerprints, and determines whether the received video object is indeed a video object associated with the stored fingerprint.

The components of the data protection unit 125 work together to mark and protect a video object at different stages of a video processing pipeline. In some embodiments, the protection module 209 may add the protection data, i.e., authentication data and video identifier(s), to the video object before transmission of the video object (e.g., at a source such as a fragment producer unit) and the authentication module 211 may authenticate the video object after it has been transmitted to a verification end (e.g., a destination such as a consumer unit). The source and the destination are not necessarily the start and the end of the entire transmission of the video processing pipeline. Instead, the source and the destination represent the start and the end of a certain transmission path, usually between two different entities, for example, between a fragment producer unit and a consumer unit. As a result, the video object can be marked and protected at different stages or between different transmission paths. For example, if a video fragment is created by a fragment producer unit and transmitted to a database for storage and is then retrieved from the database and transmitted to a consumer unit, different protection can be used for each path of the transmission. For the first transmission path of the video fragment between the fragment producer unit and the database, the protection module 209 may use a first video identifier (e.g., a first watermark) to identify the fragment producer unit as the source and the authentication module 211 may authenticate the video fragment at the database. For the second transmission path of the video fragment between the database and the consumer unit, the protection module 209 may use a second video identifier (e.g., a second watermark) to identify the database as the source, and the authentication module 211 may authenticate the video fragment at the consumer unit.

Figure 3A:
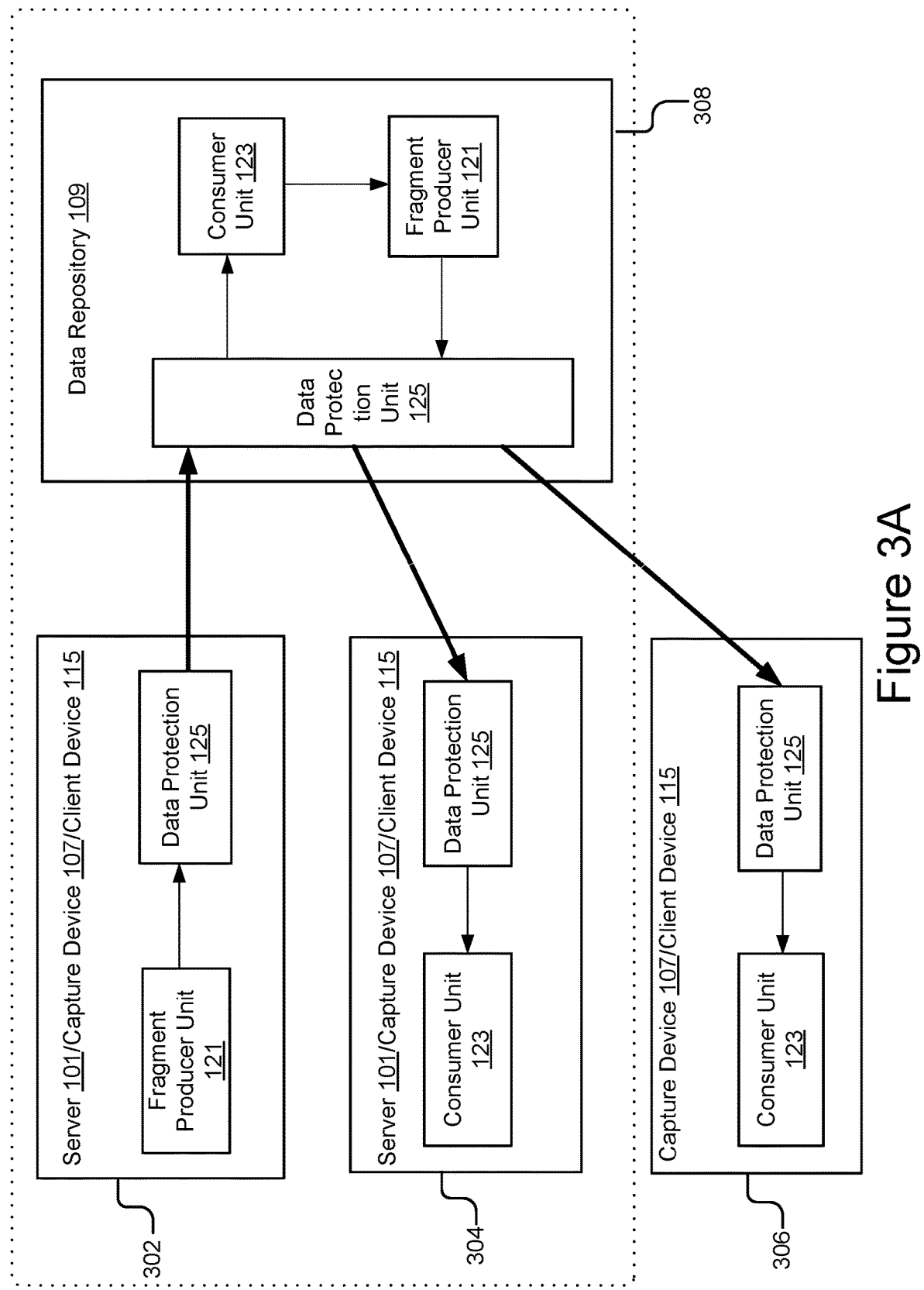
FIG. 3A depicts a block diagram illustrating an example video processing pipeline.

FIG. 3A depicts a block diagram illustrating one embodiment of a video processing pipeline constructed based on entities of the system in FIG. 1A. Each entity 302-308 represents an entity or an actual device in FIG. 1A. Each entity includes at least a fragment producer unit and/or a consumer unit to produce or use a video object. For example, entity 302 may be a server 101, a capture device 107 or a client device 115 that includes a fragment producer unit 121 to generate a video fragment. Entity 304 may be a server 101, a capture device 107 or a client device 115 that includes a consumer unit 123 to create a video composition. Entity 306 may be a capture device 107 or a client device 115 that includes a consumer unit 123 to present one or more video fragments to a user, while entity 308 is a data repository 109 that includes both a fragment producer unit 121 and a consumer unit 123. The consumer unit 123 can be a database that receives fragments and updates itself with the received fragments. The fragment producer unit 121 returns a video fragment responsive to a query.

Additionally, each entity 302-308 includes a data protection unit 125 to protect a video object from malicious intrusions and to verify the identity and source of the video object. As depicted in FIG. 3A, the data protection unit 125 acts as an interface between different entities. The video data transmitted between the entities (as shown in the bold arrows) is protected and authenticated through the data protection unit 125. For example, when fragment producer unit 121 of entity 302 generates a video fragment, the data protection unit 125 of entity 302 adds the authentication data and video identifier(s) to the fragment before transmitting it to the data repository 109. Responsive to receiving the video fragment, the data protection unit 125 of the data repository 109 determines whether the video fragment is modified and whether the source is the fragment producer unit of entity 302.

Figure 3B:
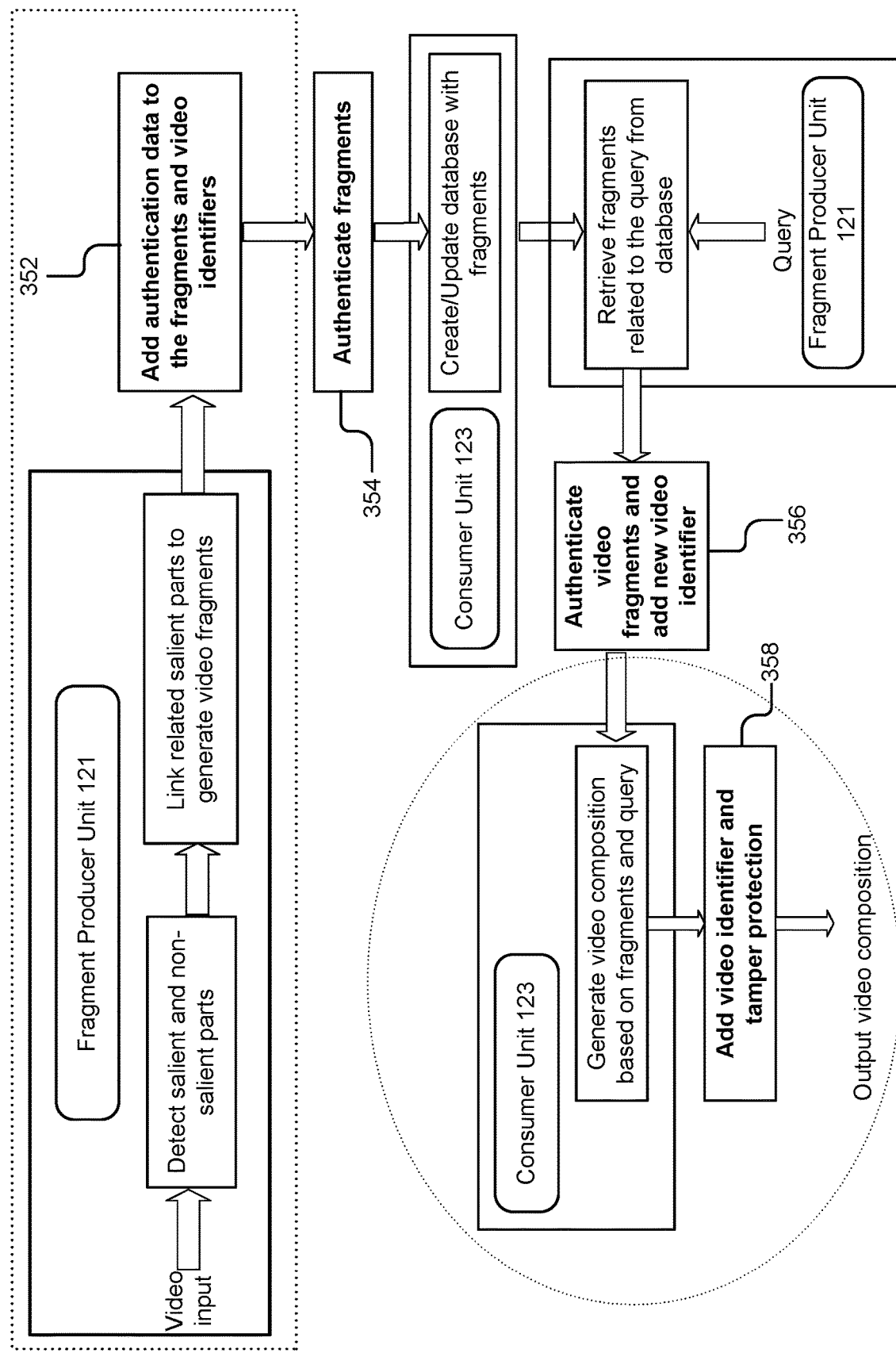
FIG. 3B depicts a block diagram illustrating an example video processing pipeline where one or more video objects are marked and protected at different stages.

A portion of the video processing pipeline as shown in the dashed box of FIG. 3A is further detailed in FIG. 3B. FIG. 3B depicts a block diagram illustrating one embodiment of a video processing pipeline where one or more video objects are marked and protected at different stages. Two goals of the techniques disclosed herein are to provide (1) tamper detection/protection and (2) video object source identification. Although not explicitly shown in FIG. 3B, a data protection unit 125 in communication with other components of the system 100 is used to achieve the two goals.

As to the tamper detection/protection, two scenarios may be considered in FIG. 3B. In the first scenario, the data protection unit 125 receives data of one or more video objects from the fragment producer unit 121 and associates, at 352, each video object with either a digital signature or a semi-fragile watermark (i.e., the authentication data) before transmitting the data to the consumer unit 123. A video object includes a video fragment generated by the frame producer unit 121 of a smart camera or other capture devices. The fragment is first associated with tamper-protection data before being sent to a destination, e.g., a database. When the database, or the consumer unit 123, receives the video object, the data protection unit 125 communicating with the consumer unit 123 authenticates, at 354, the video object by detecting the watermark or confirming the signature. Once the integrity of the video object is determined, the consumer unit 123 updates the database with the authenticated video object.

In the second scenario, a query is presented to the database and the database produces fragments as a response. The database that produces the fragments based on the query is considered as a fragment producer unit 121. Since the fragments or objects were already tamper-proofed in the first scenario, the signature or watermark associated with the objects may be re-used. In other embodiments, a new signature or watermark may be generated for the fragments. When the fragments are further processed internally within the database itself, for example, by handling a complex request that is expressed as the result of two cascading queries, the fragment producer unit 121 or the database does not need to communicate with the data protection unit 125 to perform any operation. In this situation, a tamper detection step is not necessary because both the producer and consumer are the same entity. However, if the data of the video fragments is to be transmitted remotely or to an external consumer unit, such as a consumer unit 123 displaying the fragments (not shown) or a consumer unit 123 generating a video composition based on the fragments, the fragment producer unit 121 would communicate with the data protection unit 125 to authenticate, at 356, the fragments using tamper detection mechanism.

As to video object source identification, three scenarios are considered in FIG. 3B. Among the third, fourth, and fifth scenarios described below, the source identification operations in the third and fourth scenarios are performed at the same stages of the video processing pipeline, i.e., steps 352-358 in FIG. 3B, as the tamper protection operations performed in the first and second scenarios.

In the third scenario, responsive to receiving a video fragment generated by the fragment producer unit 121 of a smart camera, the data protection unit 125 associates at 352, the video fragment with a fingerprint and updates a database of fingerprints. In some embodiments, the data protection unit 125 may associate a robust watermark instead of the fingerprint with the fragment. Both the fingerprint and the robust watermark are used as video identifiers for determining the source of the fragment at the next verification end, e.g., a database or the consumer unit 123 in FIG. 3B. The data protection unit 123 adds the fingerprint or the robust watermark to the fragment before sending the fragment to the database.

Once the consumer unit 123 or the database receives the fragment associated with the fingerprint, the data protection unit 125 of the consumer unit 123 links to the fingerprint database to identify a stored fingerprint that matches the received fingerprint. Based on the fingerprint match, the data protection unit 125 compares the received video fragment with a stored video fragment and authenticates, at 354, the source of received video fragment. If the video identifier is a robust watermark, the data protection unit 125 of the consumer unit 123 extracts the watermark and authenticates, at 354, the source of the fragment based on the watermark information.

In the fourth scenario, a query is presented to the database and the database produces fragments as a response, forming a fragment producer unit 121. If a fingerprint is used as the video identifier of a fragment, no further operation needs to be done since the fragment is already in the fingerprint database. However, if watermarking is used, the data protection unit 125 embeds, at 356, a new watermark into the fragment to reflect its new source, i.e., the database, and transmits the freshly updated fragment. Similarly, to the third scenario described above, the data protection unit 125 communicating with the fragment producer unit 121 also authenticates the source of the fragment before transmitting the fragment to a remote or external consumer unit 123.

The fifth scenario is about the protection of a video composition. Once a consumer unit 123 creates a video composition based on the fragments received from the fragment producer unit 121, the data protection unit 125 adds, at 358, authentication data (e.g., a digital signature or a fragile/semi-fragile watermark) for tamper protection such that the newly created video composition would not be manipulated or altered. In addition, the data protection unit 125 also ensures that the video composition is watermarked or fingerprinted at 358 so that the source is authenticated.

Figure 4A:
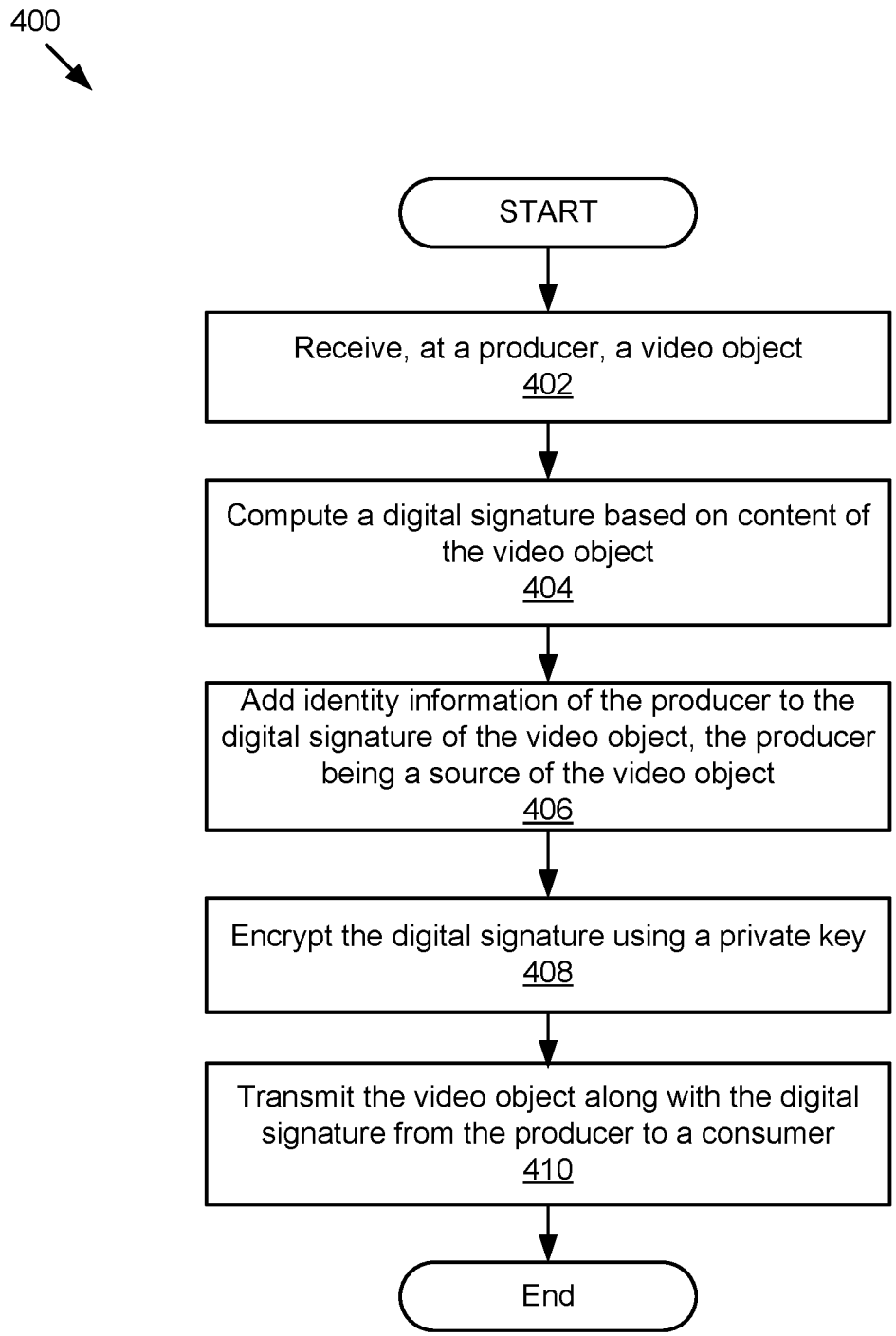
FIG. 4A depicts a flow diagram illustrating an example method for adding protection data to a video object to ensure the integrity of the video object and identify the source of the video object.

FIG. 4A depicts a flow diagram illustrating one embodiment of a method 400 for adding protection data to a video object to ensure the integrity of the video object and identify the source of the video object. As described above, the data product unit 125 of a producer may include a data processing module 201, a signature generator 203, and a protection module 209. The producer is the source of transmitting a video object. The producer can be the server 101, the capture device 107, or the client device 115 that includes a fragment producer unit to generate the video object, i.e., a video fragment or a video composition. At 402, the data processing module 201 of the producer receives a video object. At 404, the signature generator 203 of the producer computes a digital signature based on content of the video object. At 406, the protection module 209 of the producer adds identity information of the producer to the digital signature of the video object, the producer being a source of the video object. At 408, the protection module 209 of the producer encrypts the digital signature using a private key. At 410, the protection module 209 of the producer transmits the video object along with the digital signature from the producer to a consumer.

Figure 4B:
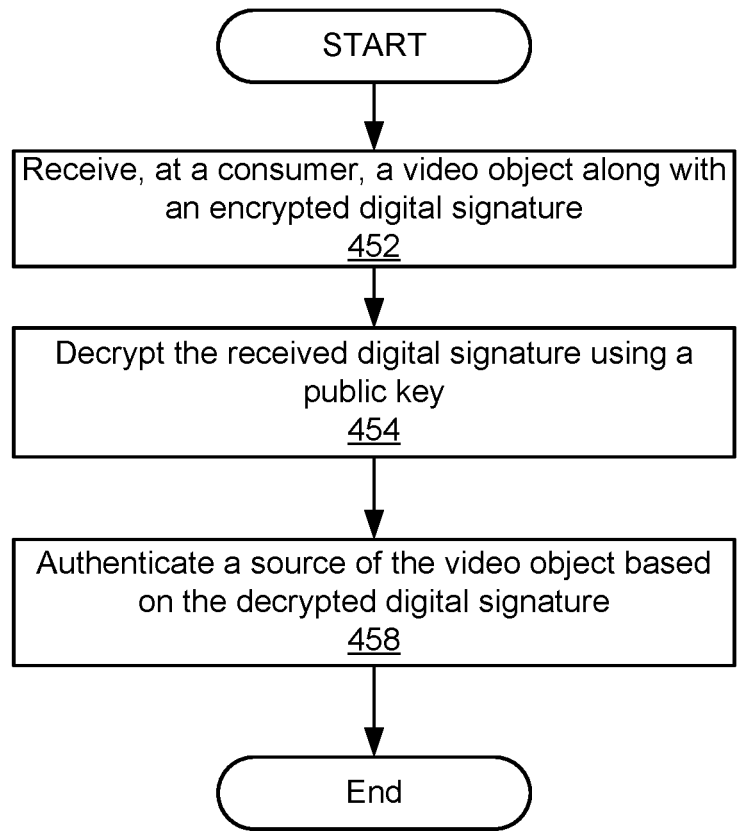
FIG. 4B depicts a flow diagram illustrating an example method for authenticating a video object based on protection data transmitted along with the video object.

FIG. 4B depicts a flow diagram illustrating embodiments of a method 450 for authenticating a video object based on protection data transmitted along with the video object. As described above, the data product unit 125 of a consumer may include a data processing module 201 and an authentication module 211. The consumer is a transmission destination or a verification end where the video object is verified to determine whether it has been attacked during the transmission. At 452, the data processing module 201 of the consumer receives a video object along with an encrypted digital signature. The digital signature is encrypted using a private key by the producer before transmission. At 454, the authentication module 211 of the consumer decrypts the received digital signature using a public key. The public key is paired with the private key used to encrypt the digital signature. The decrypted signature includes the identification information of the producer and content information of the video object. At 458, the authentication module 211 of the consumer authenticates a source of the video object based on the decrypted digital signature.

Figure 5:
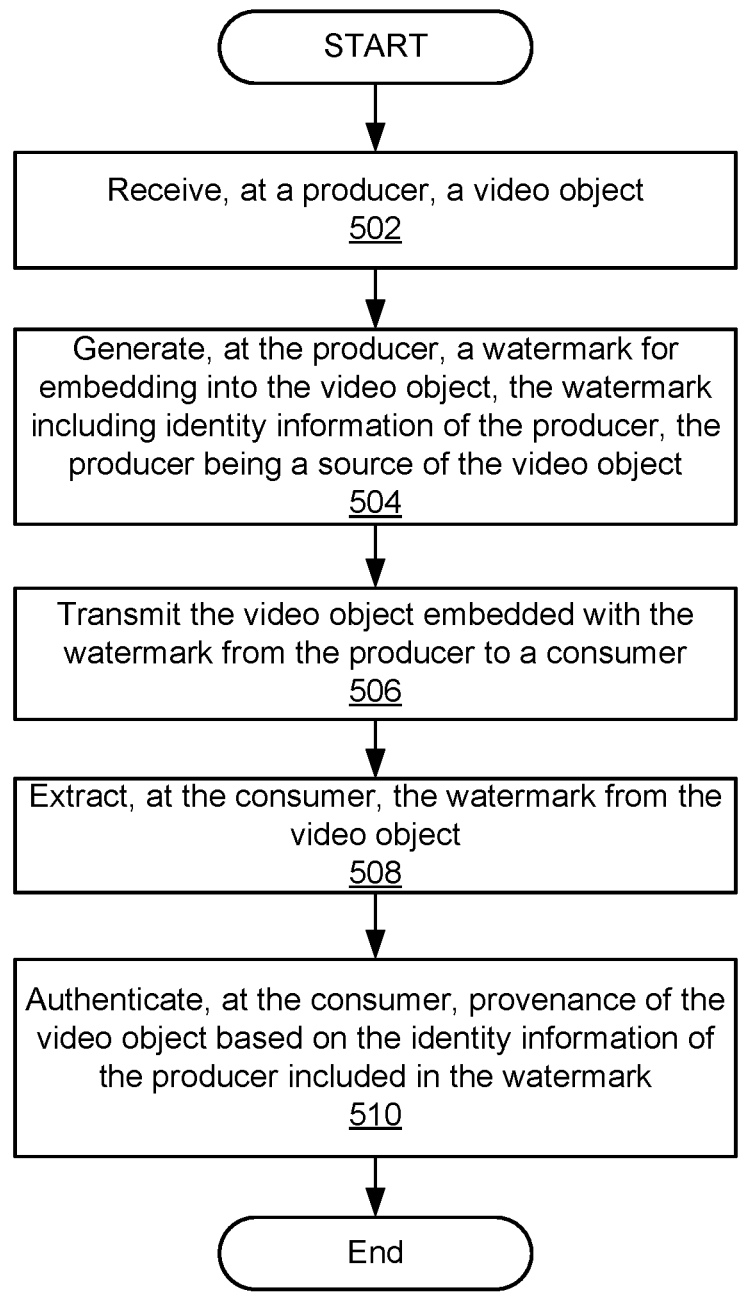
FIG. 5 depicts a flow diagram illustrating an example method for associating protection data to a video object and verifying the content and source of the video object based on the protection data.

FIG. 5 depicts a flow diagram illustrating embodiments of a method 500 for associating protection data to a video object and verifying the content and source of the video object based on the protection data. The method 500 is implemented by a data protection unit 125 of a producer and a data protection unit 125 of a consumer. The producer is the source that transmits a video object to the consumer. The consumer is the destination that receives the video object from the producer.

At 502, the data protection unit 125 of the producer receives a video object. At 504, the data protection unit 125 of the producer generates a watermark for embedding into the video object, the watermark including identity information of the producer, the producer being a source of the video object. At 506, the data protection unit 125 of the producer transmits the video object embedded with the watermark from the producer to a consumer. At 508, the data protection unit 125 of the consumer extracts the watermark from the video object. At 510, the data protection unit 125 of the consumer authenticates the source of the video object based on the identity information of the producer included in the watermark.

Figure 6:
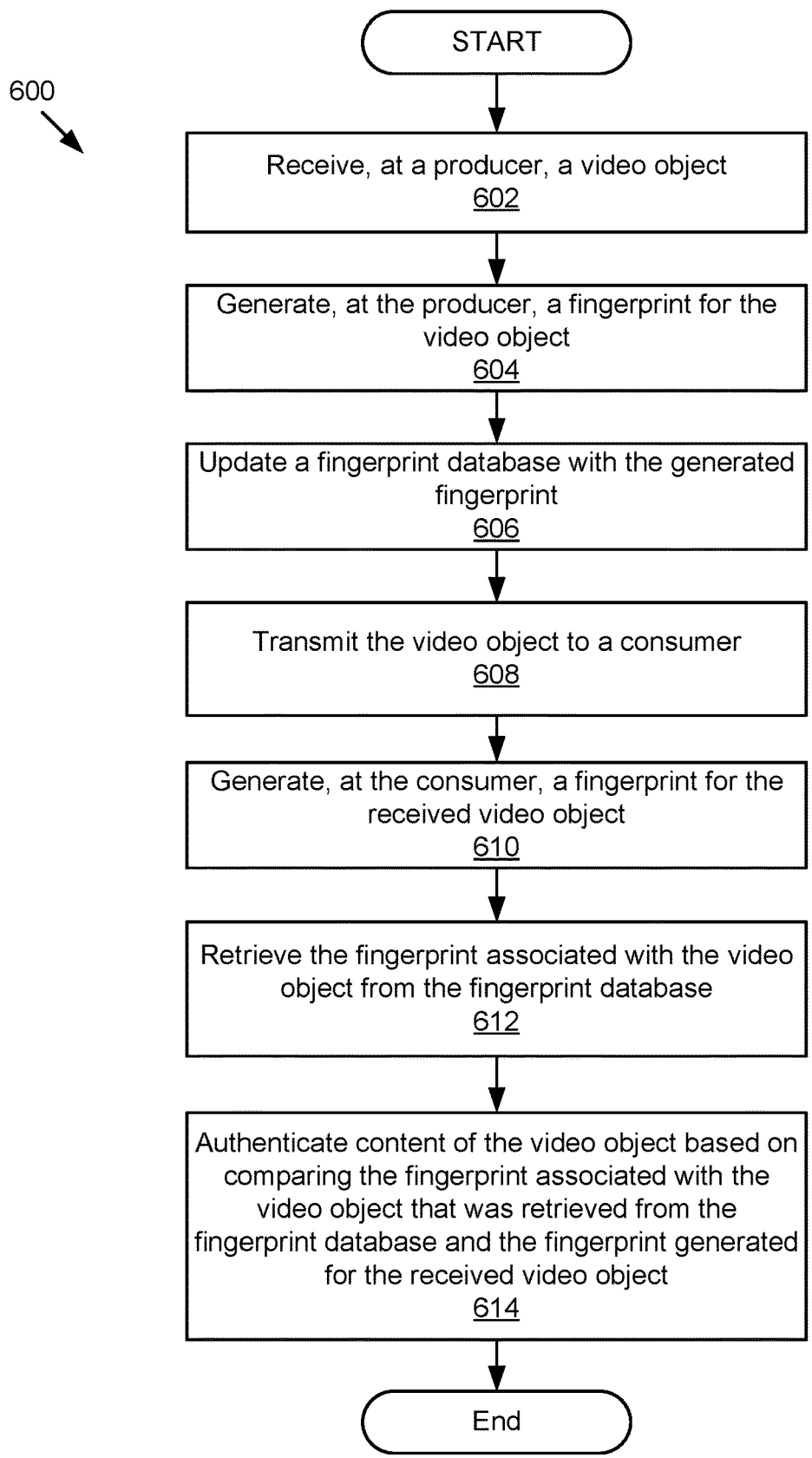
FIG. 6 depicts a flow diagram illustrating an example method for associating protection data to a video object and verifying the content and source of the video object based on the protection data.

FIG. 6 depicts a flow diagram illustrating embodiments of a method 600 for associating protection data to a video object and verifying the content and source of the video object based on the protection data. The method 600 is implemented by a data protection unit 125 of a producer and a data protection unit 125 of a consumer. The producer is the source that transmits a video object to the consumer. The consumer is the destination that receives the video object from the producer.

At 602, the data protection unit 125 of the producer receives a video object. At 604, the data protection unit 125 of the producer generates a fingerprint for the video object and at 606 updates a fingerprint database with the generated fingerprint. At 608, the data protection unit 125 of the producer transmits the video object to a consumer.

At 610, an authentication module 211 of the consumer generates a fingerprint for the received video object. At 612, the authentication module 211 of the consumer retrieves the fingerprint associated with the video object from the fingerprint database. For example, the authentication module 211 retrieves the fingerprint based on an identifier of the video object. At 614, the authentication module 211 of the consumer authenticates content of the video object based on comparing the fingerprint associated with the video object that was retrieved from the fingerprint database and the fingerprint generated for the received video object.

A system and method for associating protection data to a video object and verifying the content and source of the video object based on the protection data has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, at a producer, a video object;
   computing, at the producer, a digital signature based on content of the video object;
   adding, at the producer, identification information of the producer to the digital signature of the video object, the producer being identified as a source of the video object that transmits the video object to a destination;
   transmitting the video object along with the digital signature from the producer to a first consumer;
   authenticating, at the first consumer, the content and source of the video object based on the digital signature;
   generating, at the first consumer, a second digital signature based on the content of the video object;

adding, at the first consumer, identification information of the first consumer to the second digital signature of the video object, the first consumer being identified as the source of the video object that transmits the video object to a destination; and transmitting the video object along with the second digital signature to a second consumer, wherein the video object is authenticated, at the second consumer, based on the second digital signature to determine whether the source of the video object is the first consumer.

2. The computer-implemented method of claim 1, further comprising:

encrypting, at the producer, the digital signature using a private key; and wherein transmitting the video object along with the digital signature from the producer to the first consumer includes transmitting the encrypted digital signature.

3. The computer-implemented method of claim 2, further comprising:

decrypting, at the first consumer, the digital signature using a public key.

4. The computer-implemented method of claim 1, wherein the video object is at least one of a video fragment or a video composition.

5. The computer-implemented method of claim 1, wherein the producer is at least one of a first device that generates the video object or a database that returns the video object, and wherein the first consumer is a second device that receives and uses the video object.

6. The computer-implemented method of claim 1, further comprising:

generating, at the producer, a first watermark for embedding into the video object, the first watermark including identity information of the producer; and extracting, at the first consumer, the first watermark from the video object, wherein authenticating, at the first consumer, the source of the video object is further based on the identity information of the producer included in the first watermark.

7. The computer-implemented method of claim 6, further comprising:

generating, at the first consumer, a second watermark for embedding into the video object, the second watermark including identity information of the first consumer; and transmitting the video object embedded with the second watermark from the first consumer to a second consumer, wherein the video object is authenticated, at the second consumer, based on the second watermark to determine whether the source of the video object is the first consumer.

8. The computer-implemented method of claim 1, wherein the identification information of the producer or of the first consumer comprises a semi-fragile watermark or a robust watermark.

9. A system comprising:

one or more processors; and a memory, the memory storing instructions, which when executed cause the one or more processors to:

receive, at a producer, a video object;

compute, at the producer, a digital signature based on content of the video object;

add, at the producer, identification information of the producer to the digital signature of the video object, the producer being identified as a source of the video object that transmits the video object to a destination;

transmit the video object along with the digital signature from the producer to a first consumer;

authenticate, at the first consumer, the content and source of the video object based on the digital signature;

generate, at the first consumer, a second digital signature based on the content of the video object;

add, at the first consumer, identification information of the first consumer to the second digital signature of the video object, the first consumer being identified as the source of the video object that transmits the video object to a destination; and transmit the video object along with the second digital signature to a second consumer, wherein the video object is authenticated, at the second consumer, based on the second digital signature to determine whether the source of the video object is the first consumer.

10. The system of claim 9, wherein the instructions further cause the one or more processors to:

encrypt, at the producer, the digital signature using a private key; and wherein transmitting the video object along with the digital signature from the producer to the first consumer includes transmitting the encrypted digital signature.

11. The system of claim 10, wherein the instructions further cause the one or more processors to:

decrypt, at the first consumer, the digital signature using a public key.

12. The system of claim 9, wherein the video object is at least one of a video fragment or a video composition.

13. The system of claim 9, wherein the producer is at least one of a first device that generates the video object or a database that returns the video object, and wherein the first consumer is a second device that receives and uses the video object.

14. The system of claim 9, wherein the instructions cause the one or more processors to:

generate, at the producer, a first watermark for embedding into the video object, the first watermark including identity information of the producer; and extract, at the first consumer, the first watermark from the video object, wherein authenticating the source of the video object is further based on the identity information of the producer included in the first watermark.

15. The system of claim 14, wherein the instructions cause the one or more processors to:

generate, at the first consumer, a second watermark for embedding into the video object, the second watermark including identity information of the first consumer; and transmit the video object embedded with the second watermark from the first consumer to a second consumer, wherein the video object is authenticated, at the second consumer, based on the second watermark to determine whether the source of the video object is the first consumer.

16. A computer-implemented method, comprising:

receiving, at a producer, a video object;

generating, at the producer, a first watermark for embedding into the video object, the first watermark including identity information of the producer, the producer being identified as a source of the video object that transmits the video object to a destination;

transmitting the video object embedded with the first watermark from the producer to a first consumer;

extracting, at the first consumer, the first watermark from the video object;

authenticating, at the first consumer, the source of the video object based on the identity information of the producer included in the first watermark;

generating, at the first consumer, a second watermark for embedding into the video object, the second watermark including identity information of the first consumer; and transmitting the video object embedded with the second watermark from the first consumer to a second consumer, wherein the source of the video object from the first consumer is authenticated at the second consumer based on the second watermark.

17. The computer-implemented method of claim 16, further comprising:

computing, at the producer, a digital signature based on content of the video object;

adding, at the producer, identification information of the producer to the digital signature of the video object; and authenticating, at the first consumer, the content and source of the video object based on the digital signature.

18. The computer-implemented method of claim 17, further comprising:

encrypting, at the producer, the digital signature using a private key; and wherein transmitting the video object along with the digital signature from the producer to the first consumer includes transmitting the encrypted digital signature.

19. The computer-implemented method of claim 16, wherein the video object is at least one of a video fragment or a video composition.

20. The computer-implemented method of claim 16, wherein the identity information of the producer comprises a semi-fragile watermark or a robust watermark.

* * * * *